(12) United States Patent
Taniguchi et al.

(10) Patent No.: US 7,719,785 B2
(45) Date of Patent: May 18, 2010

(54) DISK DRIVE DEVICE, MANUFACTURING METHOD THEREOF, AND METHOD FOR SETTING HEATER POWER VALUE FOR A HEATER FOR ADJUSTING A CLEARANCE

(75) Inventors: Masato Taniguchi, Kanagawa (JP); Kenji Tasaka, Kanagawa (JP); Yasunori Kawamoto, Kanagawa (JP); Takuma Ito, Kanagawa (JP); Masaharu Kawamura, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 65 days.

(21) Appl. No.: 12/284,852

(22) Filed: Sep. 24, 2008

(65) Prior Publication Data

US 2009/0086367 A1    Apr. 2, 2009

(30) Foreign Application Priority Data

Sep. 27, 2007    (JP) ............................. 2007-252410

(51) Int. Cl.
G11B 21/02    (2006.01)
G11B 27/36    (2006.01)

(52) U.S. Cl. .......................................... 360/75; 360/31

(58) Field of Classification Search ....................... None
See application file for complete search history.

(56) References Cited

U.S. PATENT DOCUMENTS 5,377,058 A    12/1994 Good et al.

| 2004/0160693 | A1 | 8/2004 | Meyer |
| 2007/0030593 | A1 | 2/2007 | Hiroyuki et al. |
| 2007/0188908 | A1 | 8/2007 | Kurita et al. |
| 2007/0268614 | A1* | 11/2007 | Henry et al. ................. 360/75 |
| 2008/0192379 | A1* | 8/2008 | Kurita et al. ................. 360/75 |

FOREIGN PATENT DOCUMENTS

| JP | 07-045022 | 2/1995 |
| JP | 2007-220195 | 8/2007 |

* cited by examiner

*Primary Examiner*—Andrew L Sniezek
(74) *Attorney, Agent, or Firm*—Townsend and Townsend and Crew LLP; Patrick Duncan

(57) ABSTRACT

Embodiments of the present invention help to accomplish accurate and reliable clearance control. In one embodiment of the present invention, a disk drive device adjusts the clearance between a head element portion and a disk with a heater on a slider. The clearance control according to the present embodiment incorporates the variation in heater power efficiency in the clearance variation depending on the radial position. The clearance variation in a unit of heater power varies depending on the radial position. Taking account of the variation in the heater power efficiency in the thermal fly-height control (TFC) depending on the radial position in addition to the clearance variation between the head element portion and the disk caused by variation in fly-height or attitude, accomplishes more accurate TFC.

16 Claims, 9 Drawing Sheets

Fig.4
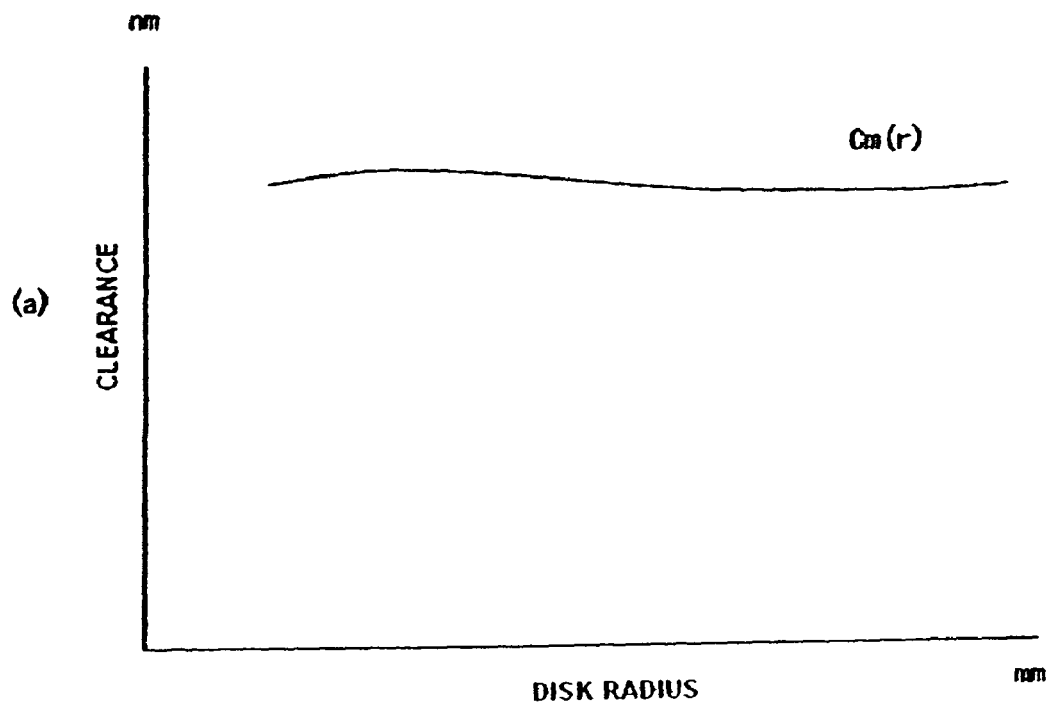
(a)
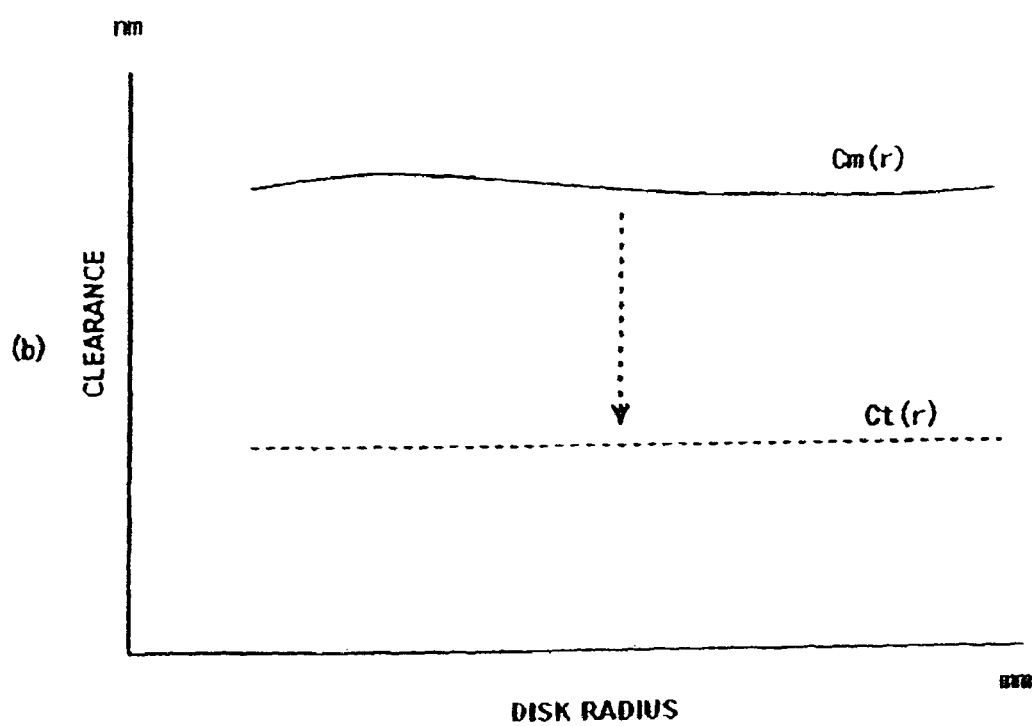
(b)

Fig.5
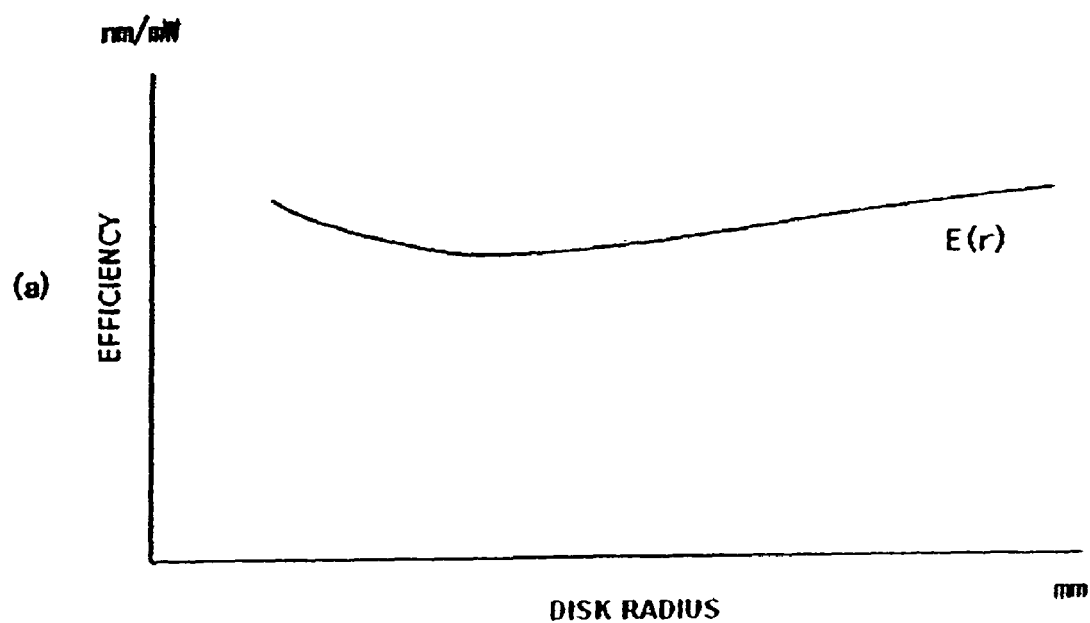
(a)
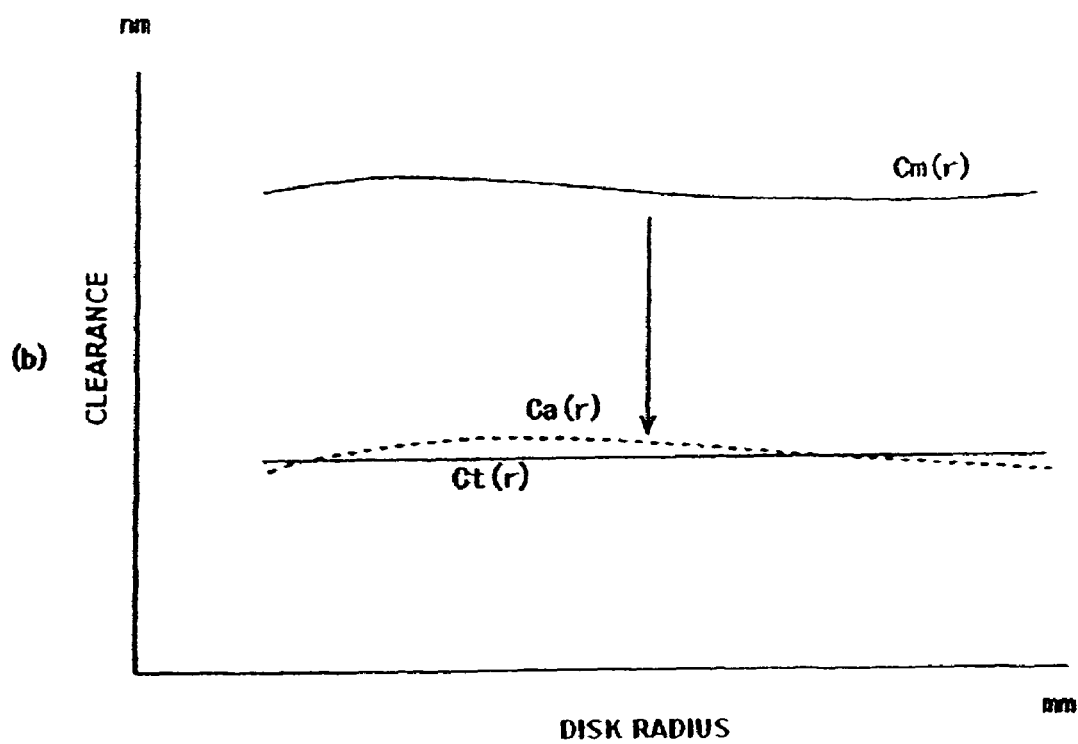
(b)

Fig.7
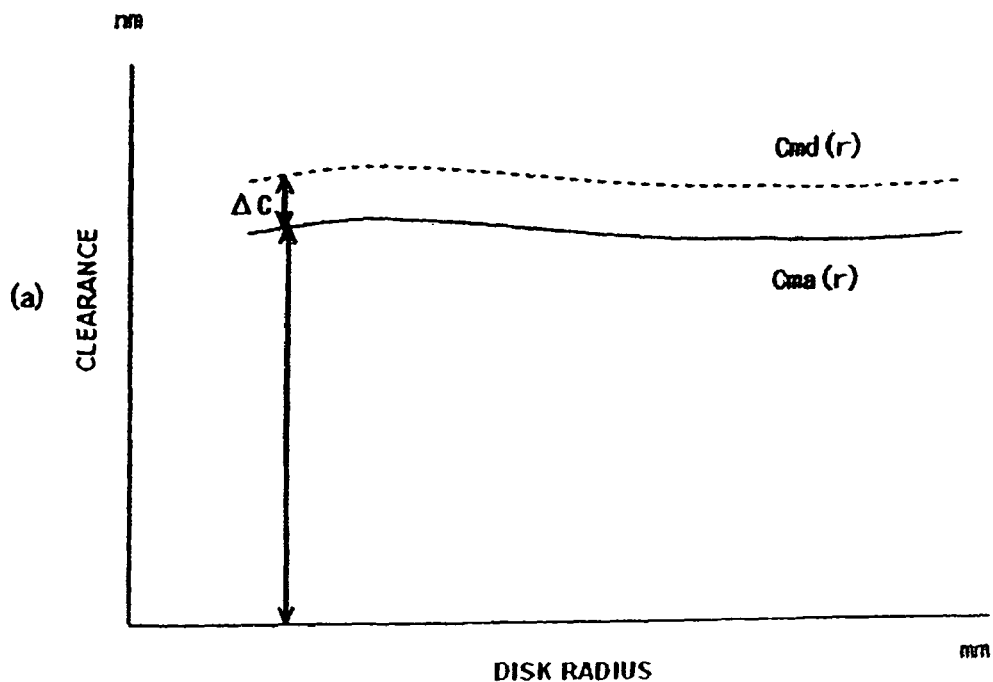
(a)
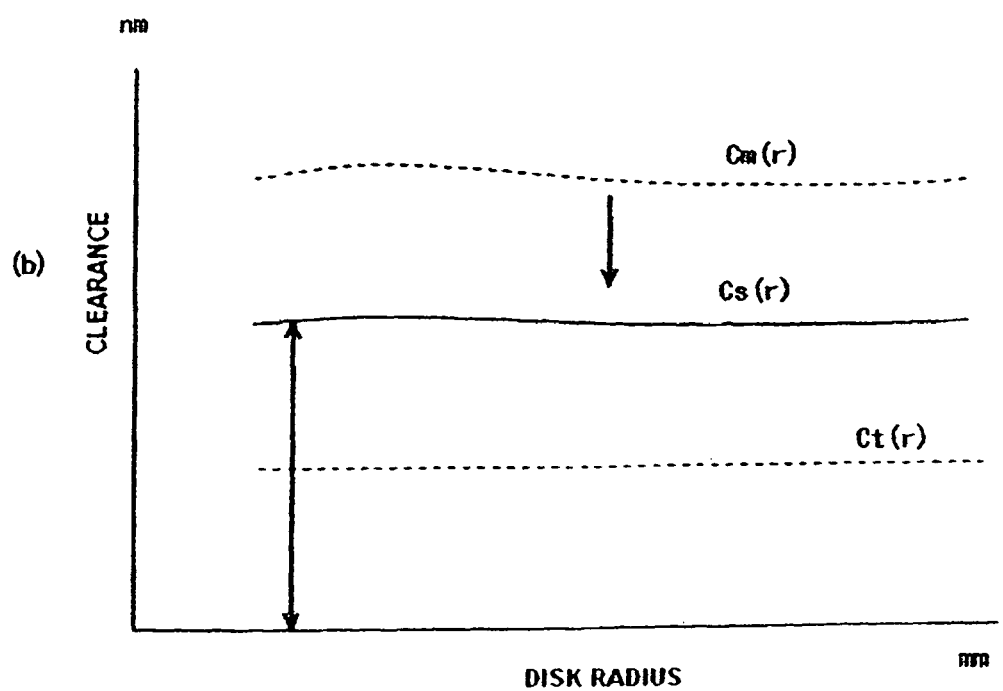
(b)

Fig.10
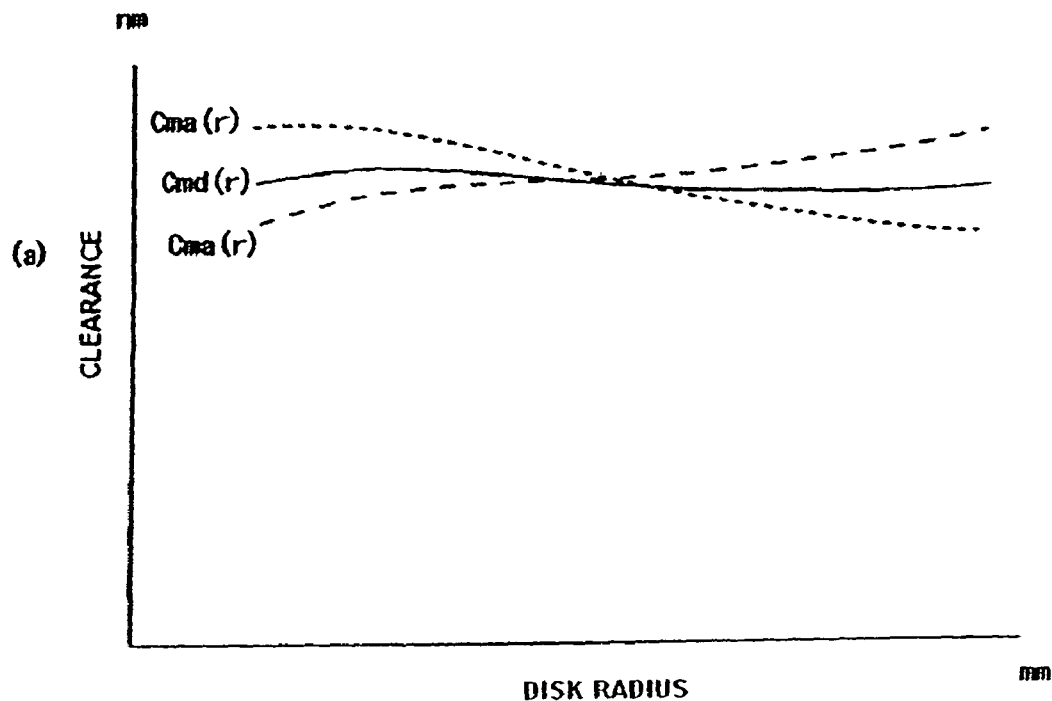
(a)
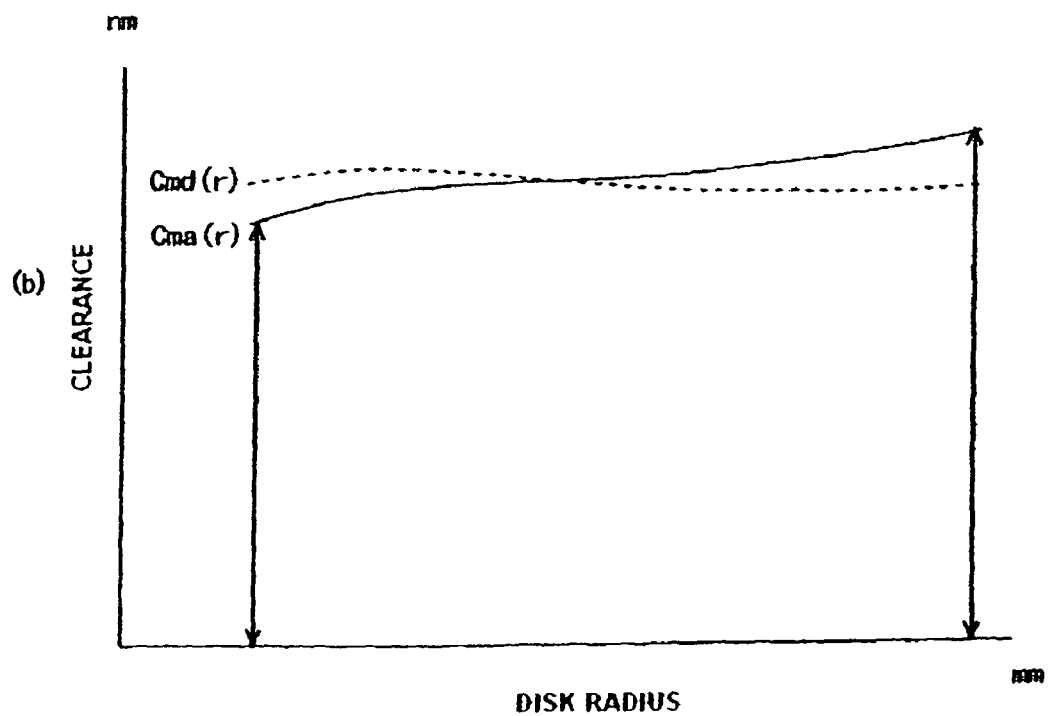
(b)

DISK DRIVE DEVICE, MANUFACTURING METHOD THEREOF, AND METHOD FOR SETTING HEATER POWER VALUE FOR A HEATER FOR ADJUSTING A CLEARANCE

CROSS-REFERENCE TO RELATED APPLICATION

The instant nonprovisional patent application claims priority from Japanese Patent Application No. 2007-252410 filed Sep. 27, 2007 and which is incorporated by reference in its entirety herein for all purposes.

BACKGROUND OF THE INVENTION

Disk drive devices using various kinds of disks, such as optical disks, magneto-optical disks, flexible magnetic disks, and the like have been known in the art. In particular, hard disk drives (HDDs) have been widely used as storage devices of computers and have been one of indispensable storage devices for current computer systems. Moreover, HDDs have found widespread application to moving image recording/reproducing apparatuses, car navigation systems, cellular phones, and the like, in addition to the computers, due to their outstanding characteristics.

A magnetic disk used in a HDD has multiple concentric data tracks and multiple servo tracks. Each servo track is constituted by a plurality of servo data containing address information. Each data track includes multiple data sectors containing user data. Data sectors are recorded between servo data located discretely in the circumferential direction. A head element portion of a head slider supported by a swinging actuator accesses a desired data sector in accordance with address information in the servo data to write data to and retrieve data from a data sector.

It is important to decrease the clearance between a head element portion flying over a magnetic disk and the magnetic disk in order to improve the recording density of the magnetic disk. To this end, some mechanisms have been proposed that adjust the clearance. One of them has a head slider equipped with a heater which heats the head element portion to adjust the clearance (for example, refer to Japanese Patent Publication No. 2007-220195 "Patent Document 1"). In the present specification, it is called thermal fly-height control (TFC). The TFC supplies the heater with electric current to generate heat and make the head element portion protrude by thermal expansion. This leads to decreasing the clearance between the magnetic disk and the head element portion.

It is preferable that the clearance be small for writing or retrieving data. On the other hand, it is important to avoid contact between the head slider and the magnetic disk caused by a too small clearance. The clearance in a heater off state varies depending on the temperature and the operation mode (read or write) as well as the radial position on the magnetic disk. Therefore, it has been proposed to control heater power depending on the radial position on the magnetic disk (for example, refer to the Patent Document 1).

The conventional technique discloses adjustment of the heater power, taking account of the clearance variation caused by variation in attitude and fly-height of the slider depending on the radial position. However, the inventors have found that what changes depending on the radial position are not only the attitude and the fly-height of the slider. Through researches by the inventors, it has been found that the clearance variation rate by the TFC changes with the radial position. That is, the heater power efficiency ($\Delta$nm/mW) on the clearance variation varies with the radial position. Consequently, it is necessary that the TFC incorporate the variation in heater power efficiency in the clearance variation depending on the radial position.

BRIEF SUMMARY OF THE INVENTION

Embodiments of the present invention help to accomplish accurate and reliable clearance control. In one embodiment of the present invention, a disk drive device adjusts the clearance between a head element portion and a disk with a heater on a slider. The clearance control according to the present embodiment incorporates the variation in heater power efficiency in the clearance variation depending on the radial position. The clearance variation in a unit of heater power varies depending on the radial position. Taking account of the variation in the heater power efficiency in the TFC depending on the radial position in addition to the clearance variation between the head element portion and the disk caused by variation in fly-height or attitude accomplishes more accurate TFC.

BRIEF DESCRIPTION OF THE DRAWINGS

FIGS. 4(a) and 4(b) are graphs depicting the relationship between the clearance and the disk radial position when the heater is OFF, and a graph depicting the relationship between the clearance adjusted by the heater and disk radial position according to one embodiment.

FIGS. 5(a) and 5(b) are drawings schematically showing variation in heater power efficiency depending on the radial position according to one embodiment.

FIGS. 7(a) and 7(b) are drawings schematically showing a method of calibration for the radial position according to one embodiment.

FIGS. 10(a) and 10(b) are drawings schematically showing a method for calibration for the radial position according to one embodiment.

DETAILED DESCRIPTION OF THE INVENTION

Figure 1:
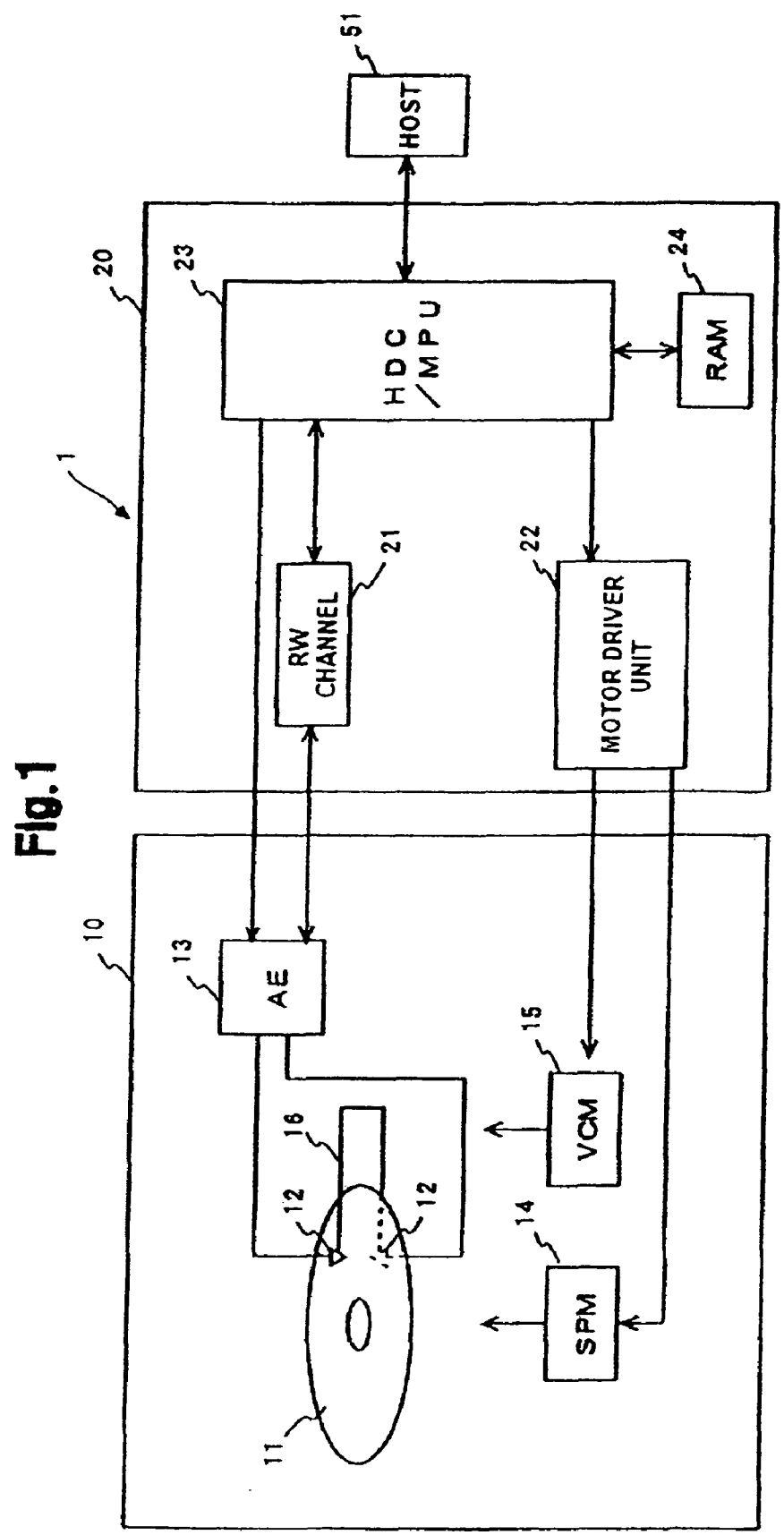
FIG. 1 is a block diagram schematically illustrating an entire configuration of an HDD according to one embodiment.

Embodiments of the present invention relate to a disk drive device, a manufacturing method thereof, and a method for setting a heater power value for a heater for adjusting a clearance, more particularly, to setting a heater power value corresponding to a radial position on a disk.

An aspect of embodiments of the present invention is a method for setting a heater power value for a heater in a disk drive device comprising a slider for flying above a disk, a head element portion provided on the slider for accessing the disk, the heater provided on the slider for adjusting the clearance between the head element portion and the disk, and a moving mechanism for moving the slider. This method obtains a mother clearance profile indicating a relationship between disk radial positions and clearances in a heater OFF state. It obtains a heater power efficiency profile indicating a relationship between disk radial positions and heater power efficiency for clearance variations. It determines a relationship between heater power to be used in operations in response to commands from an external and disk radial positions from the mother clearance profile and the heater power efficiency profile. Determining the heater power from the heater power efficiency depending on disk radial positions leads to accurate clearance adjustment.

In one example, the method presets the mother clearance profile and the heater power efficiency profile in the disk drive device, measures the clearance at a selected disk radial position with varying the heater power, and calibrates heater power values for disk radial positions in accordance with the measurement. This achieves efficient and accurate calibration of the heater power values.

The calibration of heater power values may calibrate the heater power values for the disk radial positions in accordance with the difference between the preset mother clearance profile and the actual clearance obtained from the measurement. This achieves efficient and accurate calibration of the heater power values.

The calibration of heater power values may calibrate the heater power values for the disk radial positions so as to linearly correct for the difference between the preset mother clearance profile and the actual clearance obtained from the measurement. Moreover, the calibration of heater power values calibrates the heater power values for the disk radial positions from measurements of clearances at positions in each one of the innermost zone and in the outermost zone. This achieves efficient and accurate calibration of the heater power values.

The calibration of heater power values calibrates the heater power values for the disk radial positions from the measurements of clearances at a plurality of disk radial positions. This achieves accurate calibration of the heater power values. Or, the calibration of heater power values comprises calibration of the mother clearance profile based on the measurement. This achieves effective and accurate calibration of the heater power values.

Another aspect of embodiments of the present invention is a method for manufacturing a disk drive device. This manufacturing method prepares a head slider including a slider for flying above a disk, a head element portion provided on the slider for accessing the disk, and a heater provided on the slider for adjusting the clearance between the bead element portion and the disk. It mounts a disk, the head slider, and a moving mechanism for moving the head slider in an enclosure. It creates a mother clearance profile indicating a relationship between disk radial positions and clearances in a heater OFF state. It creates a heater power efficiency profile indicating a relationship between disk radial positions and heater power efficiency for clearance variations. It determines a relationship between heater power to be used in operations in response to commands from an external and disk radial positions from the mother clearance profile and the heater power efficiency profile. Determining the heater power from the heater power efficiency depending on the disk radial position leads to accurate clearance adjustment.

The manufacturing method sets the mother clearance profile and the beater power efficiency profile obtained in designing to the disk drive device, measures the clearance at a selected disk radial position with varying the heater power, and calibrates heater power values for disk radial positions in accordance with the measurement. This achieves effective and accurate calibration of the heater power values.

A yet another aspect of embodiments of the present invention is a disk drive device comprising a slider for flying above a disk, a head element portion provided on the slider for accessing the disk, a heater provided on the slider for adjusting the clearance between the head element portion and the disk, a moving mechanism for moving the slider, and a controller for controlling the heater and the moving mechanism. The controller obtains a mother clearance profile indicating a relationship between disk radial positions and clearances in a heater OFF state, obtains a heater power efficiency profile indicating a relationship between disk radial positions and heater power efficiency for clearance variations, and determines a relationship between heater power to be used in operations in response to commands from an external and disk radial positions from the mother clearance profile and the heater power efficiency profile. Determining the heater power from the heater power efficiency depending on the disk radial position leads to accurate clearance adjustment.

Embodiments of the present invention accomplish setting of an appropriate heater power value in a disk drive device which adjusts a clearance with a heater on a head slider, avoiding contact between the head slider and a disk.

Hereinafter, particular embodiments of the present invention will be described. For clarity of explanation, the following description and the accompanying drawings contain omissions and simplifications as appropriate. Throughout the drawings, the like components are denoted by like reference numerals, and their repetitive description is omitted for clarity of explanation if not necessary. The disk drive device according to certain embodiments adjusts the clearance between a head element portion and a disk by thermal fly-height control (TFC). The TFC adjusts the clearance between a head element portion and a disk by thermal expansion due to the heat from a heater on a slider.

The TFC according to certain embodiments incorporates variation in heater power efficiency in clearance variation depending on the radial position. The clearance variation by a unit of heater power varies with radial position. The embodiments accomplish more accurate TFC by taking account of variation in the heater power efficiency depending on the radial positions in addition to the variations in clearance between the head element portion and the disk caused by variation in fly-height or attitude of the slider depending on the radial positions. The embodiments further calibrate the TFC on every HDD or every recording surface. Specifically, the embodiments calibrate the heater power for the radial position to accomplish more accurate and more reliable TFC for the HDD or the head slider (recording surface).

Hereinafter, particular embodiments of the present invention will be described by way of example of a hard disk drive (HDD), which is an example of a disk drive device. First, an entire configuration of an HDD will be outlined. FIG. 1 is a block diagram schematically depicting an entire configuration of an HDD 1. The HDD 1 comprises a magnetic disk 11, a disk for storing data, inside an enclosure 10. A spindle motor (SPM) 14 spins the magnetic disk 11 at a specific angular rate. Head sliders 12 are provided to access (read or write) the magnetic disk 11; each of them corresponds to each recording surface of the magnetic disk 11. Access is a broader concept comprising read and write. Each head slider 12 comprises a slider for flying over the magnetic disk and a head element portion fixed on a slider for converting magnetic signals to and from electric signals.

Each of the head sliders 12 according to one embodiment comprises a heater for the TFC to make the head element portion expand and protrude by heat and adjust the clearance (fly-height) between the head element portion and the magnetic disk 11. The structure of the head slider 12 will be described later in detail referring to FIG. 3. Each of the head slider 12 is fixed to a tip end of an actuator 16. The actuator 16, which is coupled to a voice coil motor (VCM) 15, pivots about a pivotal shaft to move the head sliders 12 above the magnetic disk 11 in its radial direction. The actuator 16 and the VCM 15 are moving mechanisms of the head sliders 12.

On a circuit board 20 fixed outside the enclosure 10, circuit elements are mounted. A motor driver unit 22 drives the SPM 14 and the VCM 15 in accordance with control data from an HDC/MPU 23. A RAM 24 functions as a buffer for temporarily storing read data and write data. An arm electronics (AE) 13 inside the enclosure 10 selects a head slider 12 to access the magnetic disk 11 from multiple head sliders 12, amplifies reproducing signals therefrom to send them to a read-write channel (RW channel) 21. Further, it sends recording signals from the RW channel 21 to the selected head slider 12. The AE 13 further supplies the heater of the selected head slider 12 with electric power and functions as an adjusting circuit for adjusting the electric energy.

The RW channel 21, in read operation, amplifies read signals supplied from the AE 13 to have specific amplitudes, extracts data from the obtained read signals, and performs a decoding process. The retrieved data includes user data and servo data. The decoded read user data and servo data are supplied to the HDC/MPU 23. The RW channel 21, in write operation, code-modulates write data supplied from the HDC/MPU 23, converts the code-modulated data into write signals, and then supplies them to the AE 13.

The HDC/MPU 23, an example of a controller, performs entire control of the HDD 1 in addition to necessary processes concerning data processing such as read/write operation control, command execution order management, positioning control of the head sliders 12 using servo signals (servo control), interface control to and from a host 51, defect management, and error handling operations when any error occurs. In particular, the HDC/MPU 23 according to one embodiment performs the TFC and controls calibration for the TFC. This will be described later.

Figure 2:
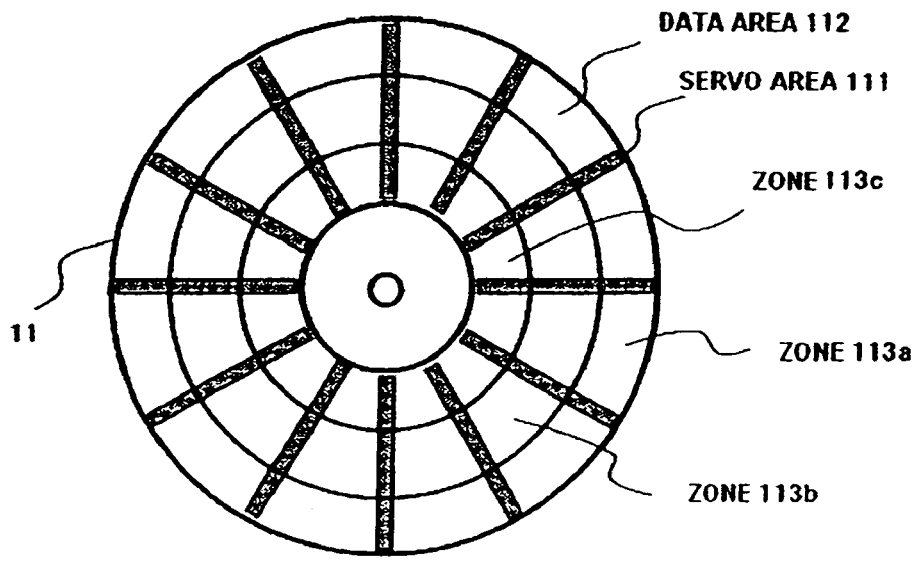
FIG. 2 is a diagram schematically illustrating a format of data stored on a magnetic disk according to one embodiment.

FIG. 2 schematically depicts recorded data on the magnetic disk 11. On the recording surface of the magnetic disk 11, a plurality of servo areas 111 extending radially in the radial direction from the center of the magnetic disk 11 and provided at every specific angle, and data areas 112 between the adjoining two servo areas 111 are formed. Servo areas 111 and data areas 112 are provided alternately at every specific angle. In each servo area 111. servo data for controlling positioning of the head sliders 12 are recorded. In each data area 112, user data are recorded. The user data and the servo data are recorded on concentric data tracks and servo tracks, respectively. In FIG. 2, data tracks are grouped into multiple zones 113a to 113c according to the radial position. Recording frequencies (BPIs) and TPIs are set to each of the zones.

Figure 3:
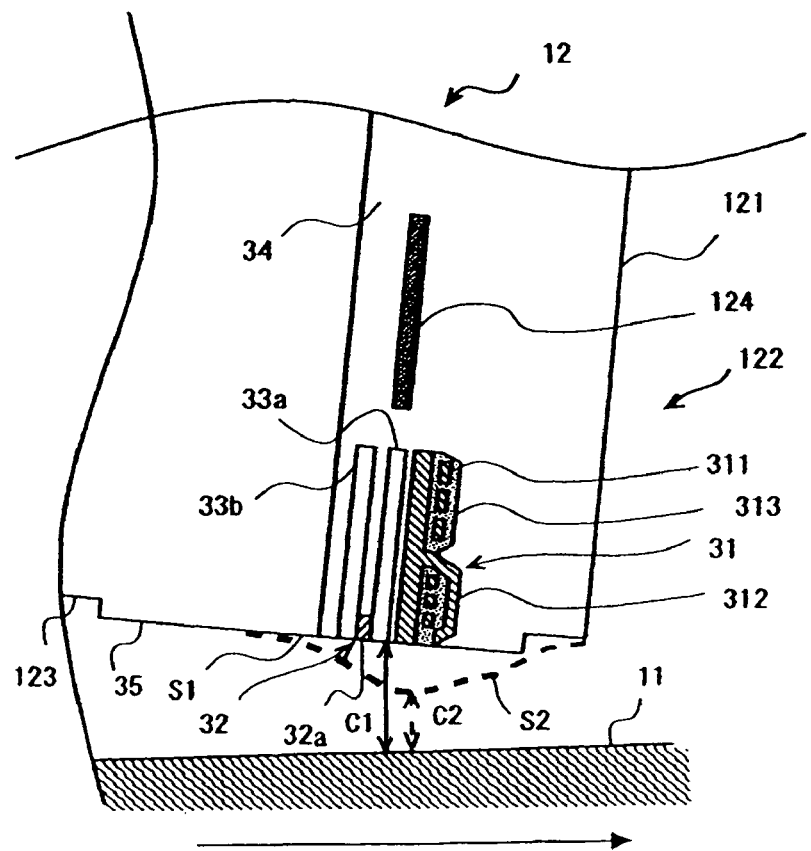
FIG. 3 is a cross-sectional view schematically illustrating a configuration of a head slider having a heater for TFC according to one embodiment.

FIG. 3 is a cross-sectional view schematically illustrating a configuration in the vicinity of an air flowing end surface (trailing side end surface) 121 of the head slider 12 of the present embodiment. A slider 123 supports a head element portion 122. The head element portion 122 comprises a read element 32 and a write element 31. The write element 31 generates magnetic fields between magnetic poles 312 by means of electric current flowing across a write coil 311 to record magnetic data onto the magnetic disk 11. The read element 32 has a magnetoresistive element 32a having magnetic anisotropy and retrieves magnetic data by means of resistance varying with magnetic fields from the magnetic disk 11.

The head element portion 122 is formed on an AlTiC substrate constituting the slider 123 by a thin film deposition process. The magnetoresistive element 32a is sandwiched between magnetic shields 33a and 33b. The write coil 311 is surrounded by an insulating film 313. A protective film 34 made of alumina or the like is formed around the write element 31 and the read element 32. A heater 124 is formed in the vicinity of the write element 31 and the read element 32. The heater 124 can be formed by winding a thin film resistive element using permalloy and the like and filling the gap with alumina.

When the AE 13 supplies the heater 124 with electric power, the vicinity of the head element portion 122 is deformed to protrude due to the heat of the heater 124 in accordance with the difference in thermal expansion rate between AlTiC and alumina. For example, in non-heating, the shape of the ABS of the head slider 12 is indicated by S1 and the clearance between the head element portion 122 and the magnetic disk is indicated by C1. The protruding shape S2 in heating the heater 124 is indicated by a dashed line. The head element portion 122 comes close to the magnetic disk 11 and the clearance C2 at this time is smaller than the clearance C1. FIG. 3 is a conceptual view and its dimensions are not rigidly defined. The protruding amount of the head element portion 122 and the clearance vary in accordance with the heater power value supplied to the heater 124.

Hereinafter, TFC and its calibration depending on the radial position on the recording surface according to the present embodiment will be described. FIG. 4(a) is a graph depicting the relationship of the clearances between the head element portion 122 and the magnetic disk 11 and the radial positions on the disk when the heater 124 is off. It is assumed that the conditions other than the radial position, such as temperature and air pressure, are constant. Hereinafter, the clearance in a heater OFF state is called a mother clearance. As understood from the profile of this mother clearance (Cm (r)), the mother clearance varies with radial position. The slider 123 changes its attitude or shifts in the up-down direction depending on the radial position so that the clearance between the head element portion 122 and the magnetic disk 11 varies, too.

With respect to the mother clearance profile, the TFC decreases the clearance by varying the heat amount of the heater 124 and achieves a target clearance at every radial position. Typically, as indicated by the dotted line Ct(r) in FIG. 4(b), the TFC controls the heater 124 so that the clearance will be the same at every radial position. The target clearance is preferably the smallest value without the head slider 12 contacting the magnetic disk 11.

An important matter is that the heater power efficiency for the clearance variations varies depending on the radial positions on the disk. FIG. 5(a) is a graph schematically depicting an example of the profile of the heater power efficiency (E(r)). The heater power efficiency is the variation in clearance in a unit of heater power and its unit is given in nm/mW. The clearance C in the TFC is given by (Cm(r)-E(r)ΔP). The Cm(r) represents the mother clearance; E(r), the heater power efficiency; R, the radius; and P, the heater power.

The TFC which does not incorporate the variation in the heater power efficiency depending on the radial position uses heater efficiency E which is invariable across the radial positions. However, in such a TFC, even if the heater power preset to change the clearance C into the target value Ct is supplied, the clearance will not be constant at every radial position as indicated by the dashed line Ca(r) in FIG. 5(b). Accurate incorporation of the beater power efficiency profile into the TFC accomplishes the target clearance Ct(r) at every radial position as indicated by the solid line in FIG. 5(b).

The reason why the heater power efficiency varies can be understood as follows: when the shape of the head element portion 122 changes (protrudes) due to the TFC, wind blows onto the protruding part, which results in generation of positive pressure in the direction to lift up the ABS. If there is no skew angle, the wind vertically blows onto the protruding part so that greater positive pressure is generated. Consequently, as the head element portion 122 is made to protrude more, the positive pressure to lift up the ABS becomes greater so that the nominal heater power efficiency (TFC efficiency) degrades. On the other hand, in the outer or inner radius positions with a larger skew angle, the positive pressure caused by the protrusion of the head element portion 122 is smaller so that the heater power efficiency is superior to the one at the central part of the disk.

In an actual operation in response to a command from a host 51, the HDC/MPU 23 performs the TFC corresponding to temperature and air pressure conditions as well as the target position (disk radial position) of the head slider 12. This is because the mother clearance (the clearance in the heater OFF state) varies depending on the temperature and the air pressure. For example, the mother clearance profiles corresponding to parameters such as the temperature, the air pressure, the radial position, and the like are stored in the magnetic disk 11 or a ROM.

The HDC/MPU 23 obtains profile data for the mother clearance corresponding to the parameters, and determines the mother clearance under the conditions in operation in accordance with the profile data. Moreover, it obtains stored profile data for the heater power efficiency and determines the relationship between the disk radial position and the heater power. Thereby, an appropriate heater power value can be specified from the target clearance Ct and the heater power efficiency profile E(r). The TFC corresponding to the temperature or the air pressure is a known technique and detailed description about it will be omitted in the present specification.

In one example, an HDD 1 creates its own mother clearance profile Cm(r) and heater power efficiency profile E(r). The HDC/MPU 23 can determine the relationship between the disk radial position and the heater power. Specifically, the HDC/MPU 23 measures the clearance of each head slider 12, and creates the mother clearance profile Cm(r) and the heater power efficiency profile E(r) of each head slider 12. Preferably, the HDC/MPU 23 measures the clearance of each head slider 12, but it may incorporate the heater power efficiency corresponding to the radial position into only a part of the head sliders 12. Or, if permitted by the design, the HDC/MPU 23 may select one head slider 12 and apply the profile obtained through the measurement on the head slider to the other head sliders 12.

The HDC/MPU 23 retrieves data on the recording surface with a head slider 12 and calculates the clearance using the read signal strength of the data and the Wallace formula. Since this method is a widely known technique, detailed explanations are omitted, but the clearance variation Δd between the head element portion 122 (read element 32) and the magnetic disk 11 is expressed by:

$$A1/A0=\exp(-2\pi\Delta d/\lambda)$$  (Equation 1)

where the reference signal strength (amplitude) is represented by A0; and the measured signal strength, by A1. Here, λ is a write wavelength of the recording signal used in the signal strength measurement. The HDC/MPU 23 can obtain the physical distance of the clearance in reference to the contact between the head slider 12 and the magnetic disk 11 and further in use of this equation. The signal strength can be determined from servo VGA, for example.

In order to acquire an accurate profile, it is preferable that measurement be made at as many points as possible. However, increasing the measuring points causes increase in process time; and further, a detailed profile causes increase in operation loads. On the other hand, variation in the mother clearance and the heater power efficiency is mild and not great. In a preferred example, the mother clearance profile and the heater power efficiency profile have invariable values in each zone. In creating the profiles, it is preferable that the HDC/MPU 23 perform measurement in selected zones and form approximation lines from the measurements using predetermined functions to create the mother clearance profile and heater power efficiency profile.

In another example, the mother clearance profile and the heater power efficiency profile are created in designing the HDD 1, and they are implemented in the HDD 1 in the manufacturing. The mother clearance profile is created by bench tests including detection of head-disk contact using TFC on several HDDs 1, from their outer radial positions to their inner radial positions. Since it is difficult to detect the head-disk contact at a radial position with zero skew angle, preferably a method for measuring the fly-height using optical reflection should be used together. Or, results of simulation on the ABS may be used, too.

The heater power efficiency profile is created in the following manner: write patterns of 1 T and 2 T on the magnetic disk 11 actually and measure variation in read signals of the written patterns with an oscilloscope gradually increasing the heater power value. Then, plug the measurements into the Wallace's formula to obtain the calculation result, and obtain the variation rate of the clearance for the heater power by using a first-order approximation. Perform the above at six to ten points from the outer circumference to the inner circumference. Further, perform the same measurement on several HDDs 1 and obtain the average. Finally, create the heater power efficiency profile using a third-order approximation to the radius of the magnetic disk 11.

Figure 6:
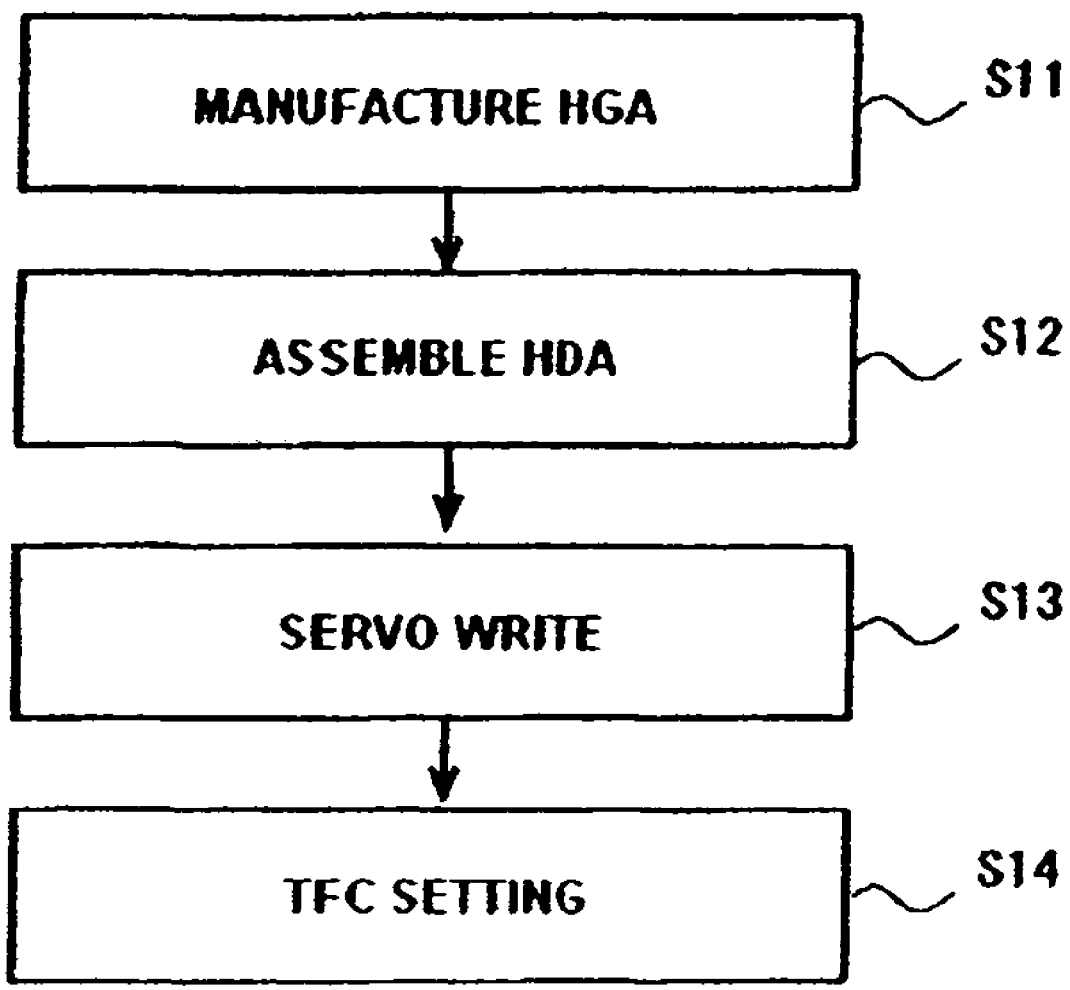
FIG. 6 is a flowchart illustrating a manufacturing method of an HDD according to one embodiment.

As shown in FIG. 6, a manufacturing method of an HDD 1 manufactures an assembly (HGA) of head sliders 12 and an actuator 16 (S11), and mounts an AE 13 on it. Further, the method mounts the HGA prepared in such a manner, an SPM 14, a magnetic disk 11, and a VCM 15 in an enclosure 10 to manufacture a head disk assembly (HDA) (S12).

The HDA is transferred to a servo write step and servo tracks are written with each head slider 12 corresponding to each recording surface of the magnetic disk 11 (S13). There is a method using a servo track writer (STW) as an external device and a method controlling the VCM 15 in the HDD 1 to write servo data (self servo write) in the servo write step. Servo write is such a widely known technique that detailed explanation is omitted in the present specification. After the servo write, the HDD 1 determines a data track format for every head slider 12 and sets the TFC of embodiments of the present invention (S14).

Although the mother clearance profile and the heater power efficiency profile change depending on the HDD 1 or the head, the shapes of those profiles do not change significantly among the HDDs 1 with the same design. Accordingly, if the HDD 1 calibrates the reference profiles which have been preset in accordance with the measurements, more accurate and more reliable TFC can be obtained. The HDC/MPU 23 calibrates the reference profiles preset in the manufacturing steps to determine an appropriate heater power value for each radial position. The reference profiles to be prepared for the above two profiles may be different ones depending on the mounting position of the head slider 12 or may be a common one to all the head sliders 12.

The heater power efficiency profile mainly depends on the design of the HDD 1 and does not depend on variation in the characteristics of each component in the HDD 1 or manufacturing tolerance very much. Therefore, the variation in the heater power efficiency profile based on these can be substantially ignored. On the other hand, the mother clearance profile changes depending on variation in mounting the magnetic disk 11. It changes depending on the fixing position and inclination of the magnetic disk 11 in mounting it on the enclosure 10. Therefore, the mother clearance profile changes from the reference profile. Hereinafter, an example of calibration of the preset mother clearance profile will be described. This calibration corresponds to calibration of the heater power for the radial position. This allows the HDC/MPU 23 to determine the relationship between the disk radial position and the heater power more accurately.

FIG. 7(a) shows examples of designed values of the mother clearance profile Cmd(r) (dashed line) and the actual mother clearance profile Cma(r) (solid line). In a typical example, the actual mother clearance profile Cma(r) shifts in the Y axis direction with respect to the reference profile Cmd(r) of designed values in HDDs 1, as shown in FIG. 7(a). That is, the difference $\Delta C$ in clearance between the reference profile and the actual profile is the same even if the radial position changes. In this example, if the HDC/MPU 23 performs TFC in accordance with the reference profile, the actual clearance becomes smaller than the target clearance so that a risk of contact between the head slider 12 and the magnetic disk 11 increases.

Figure 8:
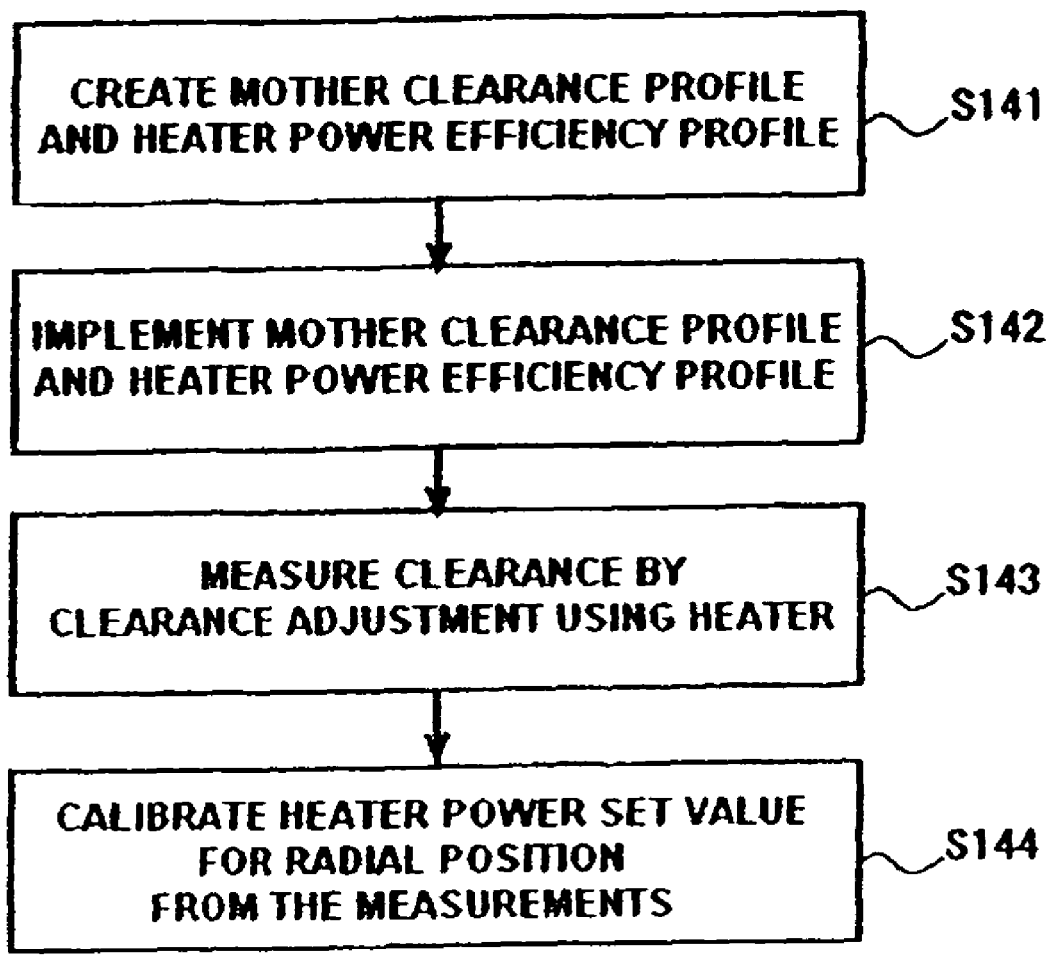
FIG. 8 is a flowchart illustrating the setting of TFC of one embodiment.

The HDC/MPU 23 calibrates the mother clearance profile so that the mother clearance profile to be used in the TFC agrees with the actual profile. As shown in FIG. 8, the mother clearance profile and the heater power efficiency profile are created in the above-described manner (S141). The prepared mother clearance profile and the heater power efficiency profile are implemented in the HDD 1 (S142). The HDC/MPU 23 varies the clearance by the TFC and thereby measures the deviation from the designed value (S143). Then, it calibrates the heater power set values for the radial positions using the measurements (S144).

In measuring the deviation from the designed value, in a preferable manner, the HDC/MPU 23 controls the heater 124 to adjust the clearance and detects contact between the head slider 12 and the magnetic disk 11. For a method for detecting contact, amplitude variation of read signals or acoustic emission sensor may be utilized. The HDC/MPU 23 can determine the deviation between the designed value and the actual value from the heater power value at contact.

Figure 9:
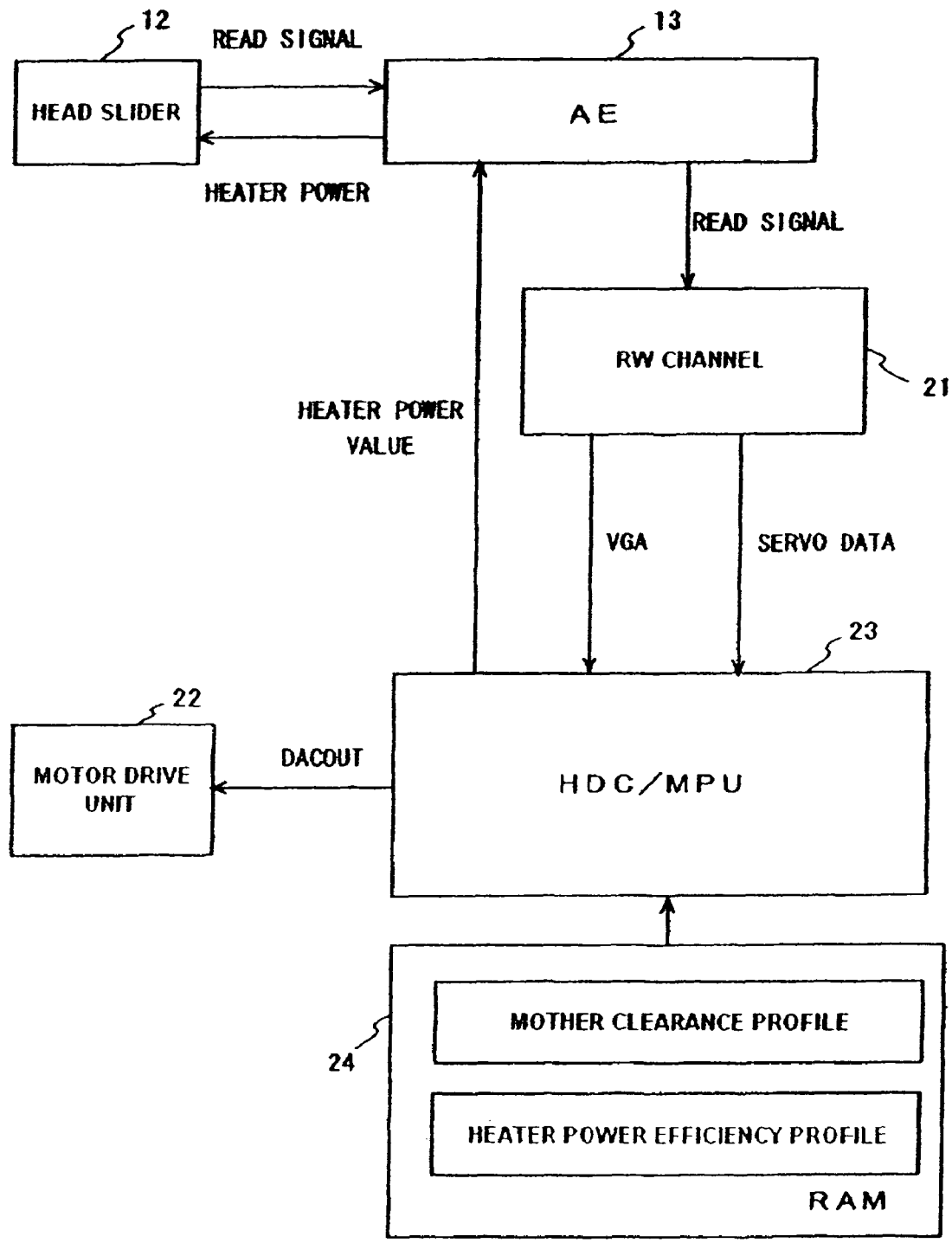
FIG. 9 is a block diagram schematically depicting components for the TFC calibration according to one embodiment.

Specifically, as shown in FIG. 9, the HDC/MPU 23 obtains servo data retrieved by a head slider 12 through the AE 13 and the RW channel 21 for head positioning, and supplies signals DACOUT for servo control to the motor driver unit 22 in accordance with the servo data. The motor driver unit 22 supplies electric current to the VCM 15 in accordance with the DACOUT. The HDC/MPU 23 sets control data indicating a heater power value to a register in the AE 13 and the AE 13 supplies the corresponding heater power to the head slider 12. The HDC/MPU 23 obtains a servo VGA value from the RW channel 21 and detects contact between the head slider 12 and the magnetic disk 11 by comparing the value with the reference value. For example, if the servo VGA value is out of the reference value range, the HDC/MPU 23 determines that a contact has occurred.

In the example of FIG. 7(a), the HDC/MPU 23 positions the head slider 12 to a specific radial position and gradually increases the heater power from a heater OFF state. For example, the HDC/MPU 23 positions the head slider 12 onto a specific data track in the innermost zone. The HDC/MPU 23 calculates the clearance variation $E(r)\Delta P$ by nm from the heater power P when the magnetic disk 11 and the head slider 12 contact and the heater power efficiency profile. Preferably, the HDC/MPU 23 performs a plurality of times of contact detection, calculates the average of the measurements, and uses it.

The reference profiles of the heater power efficiency profile and the mother clearance profile are stored in the magnetic disk 11 or a ROM. As shown in FIG. 9, the HDC/MPU 23 obtains them and stores them in a RAM 24. The HDC/MPU 23 refers the heater power efficiency profile E(r) and the mother clearance profile Cmd(r) in the RAM 24 as necessary.

The difference $(Cmd(r)-E(r)\Delta P)$ between the above clearance variation and the designed value of the mother clearance profile Cmd(r) is the shifted amount between the reference profile and the actual profile. The HDC/MPU 23 corrects for the shifted amount $(Cmd(r)-E(r)\Delta P)$ at all the radial positions to calibrate the mother clearance profile. The HDC/MPU 23 corrects for the heater power amount corresponding to the shifted amount $(Cmd(r)-E(r)\Delta P)$ with respect to the preset heater power value to achieve the target clearance at every radial position. The correction amount depends on the heater power efficiency at each radial position. This calibration is synonymous with shifting the reference mother clearance profile by the shifted amount in the Y axis direction.

The HDC/MFU 23 performs the same calibration on all of the head sliders 12. Or, it may measure a part of the head sliders 12 and apply the result to another head slider 12. For example, it selects a head slider 12 corresponding to a lower recording surface and a head slider 12 corresponding to an upper recording surface and measures them respectively. It applies the respective measurements to other head sliders 12 corresponding to the lower recording surfaces and other head sliders 12 corresponding to the upper recording surfaces, respectively.

Starting the measurement from the heater OFF state requires a long process time. Therefore, the HDC/MPU 23 preferably starts the measurement with the heater 124 supplied with specific heater power as shown in FIG. 7(b). The solid line indicates the initial clearance Cs at the start of the measurement. The HDC/MPU 23 refers to the reference mother clearance profile Cmd(r) and the heater power efficiency profile E(r) to calculate the set clearance value at the start of the measurement. Then, it determines the difference between the initial design value and the measured value in the clearance at the start of the measurement and corrects the heater power at each radial position.

FIGS. 7(a) and 7(b) show examples where the mother clearances shift in parallel in the Y axis direction. Being different from these, inclined mounting of the magnetic disk 11 or the actuator 16 sometimes causes different shifts depending on the radial positions. In such a case, the mother clearance profile is inclined as shown in FIG. 10(a). In FIG. 10(a), the graph indicated by the solid line is the reference profile. The mother clearance profile may slightly rotate about a specific point and moreover, may shift in the Y-axis direction.

When the mother clearance profile shows such variation, measurement on a single point on the magnetic disk 11 does not allow accurate calibration because the shifted amounts corresponding to the radial positions are not the same. Therefore, the HDC/MPU 23 preferably measures a plurality of points on the recording surface for calibration. Preferably, these plurality of points include points in different zones. Besides, since it is preferable that they include points as far as possible from each other, they preferably include points in the innermost circumferential zone and the outermost circumferential zone.

The shift of the mother clearance profile shown in FIG. 10(a) can be expressed by a linear function. That is, the difference between the reference mother clearance profile Cmd(r) of the designed data and the actual mother clearance profile Cma(r) at each radial position can be expressed by a linear function with a variable of the radial position. The HDC/MPU 23 performs a linear correction using this function to calibrate the mother clearance profile and the heater power value. As shown in FIG. 10(b), the HDC/MPU 23 may measure two points on the recording surface to perform an accurate calibration using the measurements. In FIG. 10(b), the dashed line represents the reference profile Cmd(r).

The HDC/MPU 23 performs the above-described contact detection at the selected two radial positions and calculates the respective clearance differences. Namely, it calculates the differences between the designed clearances and the measured clearances. The HDC/MPU 23 calculates the linear function of radial position with the two radial positions and the clearance differences at the two positions. The HDC/MPU 23 calibrates the heater power for the radial position from the difference in clearance expressed by the linear function and the heater power efficiency profile.

The HDC/MPU 23 can calculate the heater power correction value for each radial position by dividing the difference in clearance at each radial position by the heater power efficiency. This process corresponds to adding the above linear function to the preset reference mother clearance profile to perform calibration. The two points measured in this calibration are preferably in each of the innermost zone and the outermost zone. This achieves more accurate calculation of the linear function for the calibration.

As set forth above, the present invention has been described by way of example of particular embodiments, but is not limited to the above embodiments. A person skilled in the art can easily modify, add, or convert the components in the above embodiments within the scope of the present invention. For example, embodiments of the present invention can be applied to an HDD equipped with a head slider having either one of the read element or write element only, or other types of disk drive devices than the HDD. Embodiments of the present invention can be applied to an HDD having only the read element.

What is claimed is:

1. A method for setting a heater power value for a heater in a disk drive device comprising a slider for flying above a disk, a head element portion and a heater provided on the slider for adjusting the clearance between the head element portion and the disk, and a moving mechanism for moving the slider; the method comprising:
   obtaining a mother clearance profile indicating a relationship between disk radial positions and clearances in a heater OFF state;
   obtaining a heater power efficiency profile indicating a relationship between disk radial positions and heater power efficiency for clearance variations; and
   determining a relationship between heater power to be used in operations in response to commands from an external and disk radial positions from the mother clearance profile, and the heater power efficiency profile.

2. The method according to claim 1, further comprising:
   presetting the mother clearance profile and the heater power efficiency profile in the disk drive device; and
   measuring the clearance at a selected disk radial position with varying the heater power and calibrating heater power values for disk radial positions in accordance with the measurement.

3. The method according to claim 2, wherein the calibrating heater power values calibrates the heater power values for the disk radial positions in accordance with the difference between the preset mother clearance profile and the actual clearance obtained from the measurement.

4. The method according to claim 2, wherein the calibrating heater power values calibrates the heater power values for the disk radial positions so as to linearly correct for the difference between the preset mother clearance profile and the actual clearance obtained from the measurement.

5. The method according to claim 4, wherein the calibrating heater power values calibrates the heater power values for the disk radial positions from measurements of clearances at positions in each one of the innermost zone and the outermost zone.

6. The method according to claim 2, wherein the calibrating heater power values calibrates the heater power values for the disk radial positions from measurements of clearances at a plurality of disk radial positions.

7. The method according to claim 2, wherein the calibrating heater power values comprises calibration of the mother clearance profile based on the measurement.

8. A method for manufacturing a disk drive device comprising:
   preparing a head slider including a slider for flying above a disk, a head element portion and a heater provided on the slider for adjusting the clearance between the head element portion and the disk;
   mounting a disk, the head slider, and a moving mechanism for moving the head slider in an enclosure;
   creating a mother clearance profile indicating a relationship between disk radial positions and clearances in a heater OFF state;
   creating a heater power efficiency profile indicating a relationship between disk radial positions and heater power efficiency for clearance variations; and
   determining a relationship between heater power to be used in operations in response to commands from an external and disk radial positions from the mother clearance profile and the heater power efficiency profile.

9. The method for manufacturing a disk drive device according to claim 8, further comprising:
   setting the mother clearance profile and the heater power efficiency profile obtained in designing to the disk drive device; and
   measuring the clearance at a selected disk radial position with varying the heater power and calibrating heater power values for disk radial positions in accordance with the measurement.

10. A disk drive device comprising:
    a slider for flying above a disk;
    a head element portion provided on the slider for accessing the disk;
    a heater provided on the slider for adjusting the clearance between the head element portion and the disk;
    a moving mechanism for moving the slider; and a controller for controlling the heater and the moving mechanism, obtaining a mother clearance profile indicating a relationship between disk radial positions and clearances in a heater OFF state, obtaining a heater power efficiency profile indicating a relationship between disk radial positions and heater power efficiency for clearance variations, and determining a relationship between heater power to be used in operations in response to commands from an external and disk radial positions from the mother clearance profile and the heater power efficiency profile.

11. The disk drive device according to claim 10, wherein
the mother clearance profile and the heater power efficiency profile are preset in the disk drive device, and
the controller measures the clearance at a selected disk radial position with varying the heater power and calibrates heater power values for disk radial positions in accordance with the measurement.

12. The disk drive device according to claim 11, wherein the calibration of heater power values calibrates the heater power values for the disk radial positions in accordance with the difference between the preset mother clearance profile and the actual clearance obtained from the measurement.

13. The disk drive device according to claim 11, wherein the calibration of heater power values calibrates the heater power values for the disk radial positions so as to linearly correct for the difference between the preset mother clearance profile and the actual clearance obtained from the measurement.

14. The disk drive device according to claim 13, wherein the calibration of heater power values calibrates the heater power values for the disk radial positions from measurements of clearances at positions in each one of the innermost zone and the outermost zone.

15. The disk drive device according to claim 11, wherein the calibration of heater power values calibrates the heater power values for the disk radial positions from measurements of clearances at a plurality of disk radial positions.

16. The disk drive device according to claim 11, wherein the calibration of beater power values comprises calibration of the mother clearance profile based on the measurement.

* * * * *